United States Patent [19]

Cicuta et al.

[11] Patent Number: 4,925,712

[45] Date of Patent: May 15, 1990

[54] CONTAINERS HAVING LOW PERMEABILITY TO HYDROCARBON VAPORS AND PROCESS OF PRODUCING SAME

[75] Inventors: Aldo Cicuta, Novara; Amilcare Collina, Milan, both of Italy

[73] Assignee: Ausimont S.p.A., Milan, Italy

[21] Appl. No.: 227,342

[22] Filed: Aug. 2, 1988

[30] Foreign Application Priority Data

Aug. 3, 1987 [IT] Italy ................................ 21572 A/87

[51] Int. Cl.$^5$ ............................................. B65D 25/34
[52] U.S. Cl. .................................... 428/35.7; 220/454; 220/455; 244/135 B; 427/41; 428/516; 428/334
[58] Field of Search ...................... 428/35.7, 426, 500, 428/516, 334; 220/454, 455; 215/1 C, 12.2; 244/135 B; 180/69.4; 427/35.50, 38.41

[56] References Cited

U.S. PATENT DOCUMENTS

| | | | |
|---|---|---|---|
| 4,225,647 | 9/1980 | Parent | 428/35.7 |
| 4,719,135 | 1/1988 | Gerdes et al. | 428/35.7 |
| 4,772,656 | 9/1988 | Tanner | 428/35.3 |

*Primary Examiner*—James Seidleck
*Attorney, Agent, or Firm*—Stevens, Davis, Miller & Mosher

[57] ABSTRACT

Containers with low permeability to hydrocarbon vapors, and in particular to fuel vapors, having at least one surface coated with a p-xylylene polymer and/or its derivatives. The containers find use in the fuel industry and, in particular, in the automobile industry for the production of fuel tanks for cars, commercial vehicles, and motorcycles.

6 Claims, No Drawings

CONTAINERS HAVING LOW PERMEABILITY TO HYDROCARBON VAPORS AND PROCESS OF PRODUCING SAME

DESCRIPTION OF THE INVENTION

The present invention relates to containers having low permeability to hydrocarbon vapors and/or liquids, and to the relevant manufacturing process.

More particularly, the present invention relates to fuel tanks for cars and other commercial vehicles which are impermeable to vapors and/or do not show any oozing of the liquid phase of the contained fuels.

The tanks and/or vessels impermeable to hydrocarbons and/or fuels of the present invention find their use in the fuel industry in general, and in particular in the automobile industry.

It is well known that greater and greater attention is being paid to the problem of the reduction of the phenomena of dispersion and/or discharge, either fortuitous or operative, of noxious materials, such as hydrocarbons and so forth, and in particular of fuels, into the environment, because of their serious ecological and/or operative consequences. When noxious materials, such as hydrocarbons, are handled, the storage tanks, and, in particular, the fuel tanks mounted on cars, commercial vehicles, and motorcycles, are to be considered as the points more exposed to the possibility of operative dispersion because of permeation and/or oozing. As to the latter type of tanks, they are the object of particular attention from the manufacturing industry; in fact, they are generally containers with a small wall thickness, owing to obvious economic and weight-reducing reasons, and are therefore subject to the above said risk of permeation and/or oozing of the materials they contain. This is particularly evident in the case of fuel tanks made from plastic material in general, and in particular from high-density, high-molecular-weight polyethylene, a commonly used material for manufacturing tanks for cars, commercial vehicles, and motorcycles.

In fact, these tanks show a permeability value which, although it can be contained within low limits, never can be regarded as wholly negligible, in particular in the light of the existing laws and rules pertaining to such matters.

Therefore several treatments have been proposed in the past aiming at improving the characteristics of impermeability and/or ooze-prevention of the plastic materials, in particular of the high-density, high-molecular-weight polyethylene tanks, and results of some importance were obtained. Said treatments are substantially constituted by chemical surface-treatment processes, among which fluorination and sulphonation processes are the best known. These are processes which involve chemical changes in the surfaces concerned.

Although these chemical treatments allow the permeability to be improved as to the apolar aliphatic and aromatic products, their efficiency as to the polar components is poor.

It is well known that the presence of polar components in fuels is increasing, mainly because of environmental reasons, such components replacing the conventional lead-based antiknock additives.

In accordance with the present invention, it has now been discovered that containers or tanks having properties of impermeability and ooze-prevention, with respect to fuels that also contain polar components, may be obtained by coating at least one of their surfaces with a layer of at least one polymer of p-xylylene and/or its derivatives.

The coating may be applied to one or to all inner and/or outer surfaces.

The container tank, so coated on at least one of its outer and/or inner walls, according to the present invention, is particularly suitable for containing hydrocarbons and/or fuels with a substantial content of polar liquids, such as lower alcohols, such as methyl alcohol, ethyl alcohol, propyl alcohol, butyl alcohol, isobutyl alcohol and so forth.

The applied coating consists or consists essentially of at least one layer of poly-p-xylylene and/or substituted derivatives thereof and its thickness may range over wide limits. Satisfactory results may be obtained with thickness values of at least 0.01 micrometer, thicknesses from 0.1 to 100 micrometers being preferred.

The coating may be applied to containers made from any plastic material used for such a purpose, such as, e.g., polyethylene, and specifically high-density, high-molecular weight polyethylene, acetal resins, polypropylene, ethylenepropylene copolymers, polyvinylchloride, polyester and polyamide resins, and so forth.

The coating consisting or consisting essentially of at least one layer of a polymer of p-xylylene and/or its derivatives, according to the present invention, may also be combined with compatible coatings of a different nature known to those skilled in the art, such as the coatings obtained by sulphonation and fluorination.

The p-xylylene radical to be used corresponds to the formula:

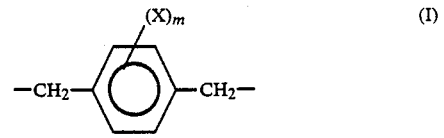

(I)

wherein:

X represents a $(C_1-C_6)$-alkyl group, a $(C_6-C_{10})$-aryl group, a $(C_7-C_{16})$-aralkyl group, a haloalkyl or haloaralkyl group, an acetoxy group, an aminoalkyl group, an arylamino group, cyano, alkoxy, hydroxy, nitro, a halogen atom, such as chlorine, bromine, fluorine and iodine, a sulphonic radical or a sulphonic ester radical, a phosphorus-based substituent, a sulphide group, an alkyl-sulphoxide group, or a hydrogen atom, and m is zero or an integer in the range of from 1 to 4.

As their reactivity causes great difficulties in storage and handling, the preferred starting compounds, in practical applications, are the p-xylylene dimer or (2,2)-paracyclophane, corresponding to formula (II):

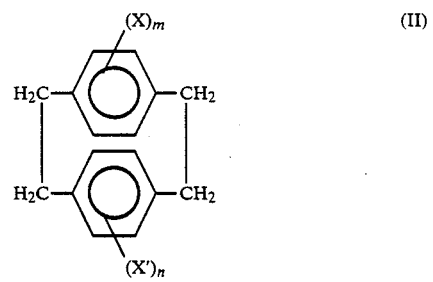

(II)

wherein:

X and X', equal to or different from each other, and m and n, equal to or different from each other, are defined as above respectively indicated for X and m.

In fact, this dimer (II) is a crystalline solid, stable at room temperature, and easy to be stored and handled. It is prepared by means of conventional methods, e.g., by pyrolysis of p-xylylene, or by means of a Hofmann degradation by starting from the corresponding p-methylbenzyl-trimethylammonium hydroxide.

The p-xylylene monomer having formula (I) is applied to the surface of the fuel container or tank, preferably by operating according to the so-called "vapor vacuum deposition" technique.

According to said technique, the divalent radicals of p-xylylene, or of its derivatives having formula (I), are produced under vacuum by pyrolytic cracking, at a temperature higher than 400° C., of the corresponding (2, 2)-paracyclophane of formula (II), whereby vapors of reactive radicals of formulae:

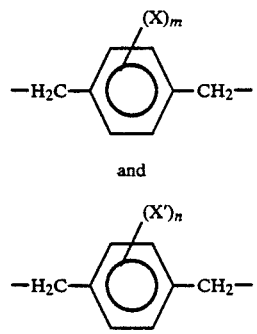

are obtained wherein X and X', m and n have the above meanings.

When m and n are equal to each other and the substituents on each ring are the same, two mols are formed having the same p-xylylene radical, which, by condensation, generate a substituted or non-substituted p-xylylene homopolymer. When, on the contrary, m and n are different from each other, and/or when the substituents X and X' in each radical are different from each other, their condensation leads to the formation of copolymers of p-xylylene or of derivatives thereof.

Together with (2,2)-paracyclophane, minor amounts may be used of other monomers, such as maleic anhydride, chloroprene, and so forth, which copolymerize on the surface of the container.

The divalent radicals of p-xylylene of formula (I) condense and polymerize nearly instantly on the surface of the container, forming a compact polymer.

The deposition process is carried out under a pressure within the range of from approximately 0.01 to approximately 1 mm Hg.

For depositing the vapors of reactive divalent p-xylylene radicals having formula (I) onto the inner and/or outer surface of a fuel tank, any known apparatus may be used, such as, e.g., the device described in the Kirk-Othmer Encyclopaedia of Chemical Technology, Third Edition, Volume 24, pages 746–747. Said apparatus generally comprises a deposition chamber capable of containing the tank to be treated, maintained at a temperature lower than 200° C., or, generally, lower than the condensation temperature of the particular p-xylylene used. The chamber is in communication with an evaporation-cracking oven. The oven is maintained at a high enough temperature to evaporate and to crack down (2,2)-paracyclophane or its derivatives. Said (2,2)-paracyclophane or derivative thereof is maintained inside the oven for a time long enough for it to evaporate and to crack, in order to form the corresponding divalent p-xylylene radicals of formula (I). These radicals flow into the deposition chamber, come into contact with the surface of the tank or of the container to be treated, and polymerize inside it.

The surfaces of the tank or container to be treated may be previously subjected to a preliminary cleaning and/or washing treatment by using, for exemplifying purposes, water, organic solvents such as lower alcohols, hydrocarbons, chlorinated hydrocarbons, and so forth, or by sand-blasting or the like.

The application of the p-xylylene monomer of formula (I) is compatible with the optional use of adhesion-promoting agents usually employed in said "vacuum deposition technique", such as, e.g., siloxanic compounds, phosphorus derivatives, and so forth.

The adhesion may also be improved by means of chemical or physical treatments, such as e.g., a flame surface treatment.

p-xylylene monomers having formula (I) used for the coating treatment are, for exemplifying purposes, chloro-p-xylylene (derived from dichloro-(2,2)-paracyclophane), dichloro-p-xylylene, cyano-p-xylylene, iodo-p-xylylene, fluoro-p-xylylene, hydroxymethyl-p-xylylene, ethyl-p-xylylene, methyl-p-xylylene, aminomethyl-p-xylylene, carbomethoxy-p-xylylene, and their mixtures.

The tank or container to be submitted to the coating process of the present invention may also have microcracks and/or delaminations, roughness, and so forth.

In fact, according to a further advantageous aspect of the present invention, p-xylylene, as such, or substituted, having formula (I), in the state of a monomer vapor, has a high aptitude for penetrating the cracks and pores in the materials, if they have a size of the order of a hundredth of a micron or a larger size, owing to the physical gaseous state, which involves a high diffusion rate and the absence of meaningful viscous flow phenomena.

It is consequently possible to achieve the penetration of the reactive monomer inside the cracks even over very great depths, such as up to one millimeter or even more.

The reactive monomer, pervasively penetrating into the above-mentioned structural microdiscontinuities, undergoes, by cooling, an in situ polymerization phenomenon, while simultaneously adhering to the inner surfaces of the part. The resulting polymeric phase is hence capable of contributing to the cohesion of the treated part, adding to the pre-existing cohesion strengths of the starting structure, which is a strengthening effect due to multiaxial adhesive action.

The present invention is still further demonstrated by the following examples, which are given for merely illustrative and not limitative purposes.

EXAMPLE 1

A motorcycle tank made from high-density, high-molecular-weight polyethylene was placed inside the deposition chamber of a vacuum-coating deposition apparatus available on the market.

0.5 gram of dichloro-di-p-xylylene was charged to the evaporation section. Dichloro-di-p-xylylene was evaporated under vacuum (at a pressure lower than 0.05 mm Hg) at 200° C. The vapors were made to flow into the cracking zone at 680° C., where they formed the divalent chloro-p-xylylene radical, and which, after entering the interior of the tank, polymerized on the walls of the tank to create a film of 0.8 micrometer thickness.

The results of the permeability tests (CUNA mixture) are reported below in Table 1.

All measurements were carried out at 40° C. after 20 days of conditioning by means of gas-chromatography, and the permeability was expressed as mg/24 hours.

EXAMPLE 2

Example 1 was repeated with the following change: 2.0 grams of dichloro-di-p-xylylene were charged to the evaporation section.

The results of the permeability tests (CUNA mixture) are reported in Table 1.

EXAMPLE 3

Example 1 was repeated with the following change: 5.0 grams of dichloro-di-p-xylylene was charged to the evaporation section of the deposition apparatus.

The results of the permeability tests (CUNA mixture) are reported in Table 1.

TABLE 1

| Compound | Percentage in the mixture | Coated Tank | | | |
|---|---|---|---|---|---|
| | | Non-coated tank | Example 1 | Example 2 | Example 3 |
| Isooctane | 41.5 | 1,200 | 80 | 60 | 45 |
| Methyl alcohol | 15 | 220 | 60 | 40 | 30 |
| Toluene | 41.5 | 1,800 | 250 | 220 | 150 |
| Isobutyl alcohol | 2 | 50 | 5 | 3 | 2 |
| DIMER AMOUNT (grams) | | | 0.5 | 2.0 | 5.0 |
| FILM THICKNESS (microns) | | | 0.8 | 2.5 | 5.4 |

What is claimed is:

1. A tank, adapted to contain a fuel for cars, motorcycles and commercial vehicles, usually oozing through polyethylene walls consisting of high-density high molecular weight polyethylene, coated, on at least one of its surfaces, by a layer of at least one polymer of paraxylylene and/or of a derivative thereof.

2. A container according to claim 1, characterized in that the coating layer is a polymer of a p-xylylene monomer having the formula:

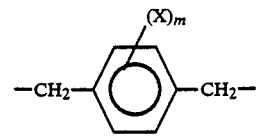

(I)

wherein:

X represents a $(C_1-C_6)$-alkyl group, a $(C_6-C_{10})$-aryl group, a $(C_7-C_{16})$-aralkyl group, a haloalkyl or haloaralkyl group, an acetoxy group, an aminoalkyl group, an arylamino group, cyano, alkoxy, hydroxy, nitro, a halogen atom, a sulphonic radical, a sulphonic ester radical, a phosphorus-based substituent, a sulphide radical, an alkyl-sulphoxide group, or a hydrogen atom, and m is zero or an integer within the range of from 1 to 4.

3. A container according to claim 2, characterized in that the p-xylylene monomer is selected from the class consisting of chloro-p-xylylene, dichloro-p-xylylene, cyano-p-xylylene, iodo-p-xylylene, fluoro-p-xylylene, hydroxymethyl-p-xylylene, ethyl-p-xylylene, methyl-p-xylylene, aminomethyl-p-xylylene, carbomethoxy-p-xylylene, and their mixtures.

4. A container according to claim 1, wherein the layer comprises at least one p-xylylene polymer containing the recurrent units:

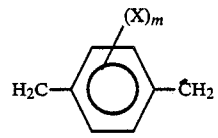

and

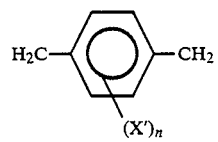

wherein the symbol X and X', equal to or different from each other, and m and n, equal to or different from each other, and are zero or an integer within the range of from 1 to 4.

5. A tank according to claim 1, wherein the thickness of said layer is greater than 0.01 micrometer.

6. A tank according to claim 5, wherein said thickness is from 0.1 to 100 micrometers.

* * * * *